(12) United States Patent
Shang et al.

(10) Patent No.: US 12,355,834 B1
(45) Date of Patent: Jul. 8, 2025

(54) CONTENT PLAYBACK OPTIMIZATION USING NEARLINE INFORMATION

(71) Applicant: Beijing YoJaJa Software Technology Development Co., Ltd., Beijing (CN)

(72) Inventors: Renfei Shang, Beijing (CN); Tongyu Dai, Beijing (CN); Si Chen, Beijing (CN); Chenyu Tian, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/421,835

(22) Filed: Jan. 24, 2024

Related U.S. Application Data

(63) Continuation of application No. PCT/CN2023/143071, filed on Dec. 29, 2023.

(51) Int. Cl.
*H04L 65/80* (2022.01)
*H04L 41/147* (2022.01)
*H04L 65/61* (2022.01)

(52) U.S. Cl.
CPC ............ *H04L 65/80* (2013.01); *H04L 41/147* (2013.01); *H04L 65/61* (2022.05)

(58) Field of Classification Search
CPC ........ H04L 65/80; H04L 41/147; H04L 65/61
See application file for complete search history.

(56) References Cited

U.S. PATENT DOCUMENTS

| | | | | |
|---|---|---|---|---|
| 10,178,043 B1 * | 1/2019 | Ganjam | ................ | H04L 65/764 |
| 11,616,993 B1 | 3/2023 | Chen et al. | | |
| 2009/0019178 A1 * | 1/2009 | Melnyk | ............... | H04N 21/2402 |
| | | | | 709/233 |
| 2015/0127844 A1 * | 5/2015 | Phillips | ................... | H04L 65/80 |
| | | | | 709/231 |
| 2020/0210430 A1 * | 7/2020 | Shen | ..................... | G06F 16/221 |
| 2020/0322661 A1 * | 10/2020 | Korte | ................ | G06Q 30/0201 |
| 2021/0021563 A1 * | 1/2021 | Hegde | ................... | H04L 47/286 |
| 2021/0029182 A1 * | 1/2021 | Mappus | .................. | H04L 65/60 |
| 2021/0204011 A1 * | 7/2021 | Jain | ...................... | H04L 41/5025 |
| 2021/0289013 A1 * | 9/2021 | Bentaleb | .......... | H04N 21/44004 |

(Continued)

OTHER PUBLICATIONS

An Introduction to Explainable AI with Shapley Values, https://shap.readthedocs.io/en/latest/example_notebooks/overviews/An%20introduction%20to%20explainable%20AI%20with%20Shapley%20values.html.pdf, printed from website on Jan. 19, 2024, 22 pages.

(Continued)

*Primary Examiner* — Javier O Guzman
(74) *Attorney, Agent, or Firm* — Kwan & Olynick LLP

(57) ABSTRACT

In some embodiments, a method determines training data from first nearline features for a first sliding time window and a fixed time window. The first sliding time window changes during a first time period and the fixed time window is static during the first time period. A prediction model is trained using the training data. The prediction model is trained for a second time period in the first time period. The method determines values for second nearline features for a second sliding time window and a fixed time window for a request for a current session that is received during the second time period. The second sliding time window is based on a time for the request. The values are input for the second nearline features into the prediction model to generate a prediction. The method performs an action for the current session based on the prediction.

20 Claims, 8 Drawing Sheets

(56) References Cited

U.S. PATENT DOCUMENTS

| | | | |
|---|---|---|---|
| 2022/0337883 A1* | 10/2022 | Grois | H04N 19/124 |
| 2023/0188764 A1* | 6/2023 | Pahalawatta | H04N 19/179 |
| | | | 725/116 |
| 2024/0121636 A1* | 4/2024 | Wang | H04L 41/16 |

OTHER PUBLICATIONS

G. Zhang, J. Zhang, Y. Liu, H. Hu, J. Y. B. Lee and V. Aggarwal, "Adaptive Video Streaming With Automatic Quality-of-Experience Optimization," in IEEE Transactions on Mobile Computing, vol. 22, No. 8, pp. 4456-4470, Aug. 1, 2023, doi: 10.1109/TMC.2022.3161351.

https://github.com/shap/shap, printed from website on Jan. 4, 2024, 13 pages.

Jiang J, Sekar V, Milner H, et al. {CFA}: A practical prediction system for video {QoE} optimization[C]//13th USENIX Symposium on Networked Systems Design and Implementation (NSDI 16). 2016: 137-150.

* cited by examiner

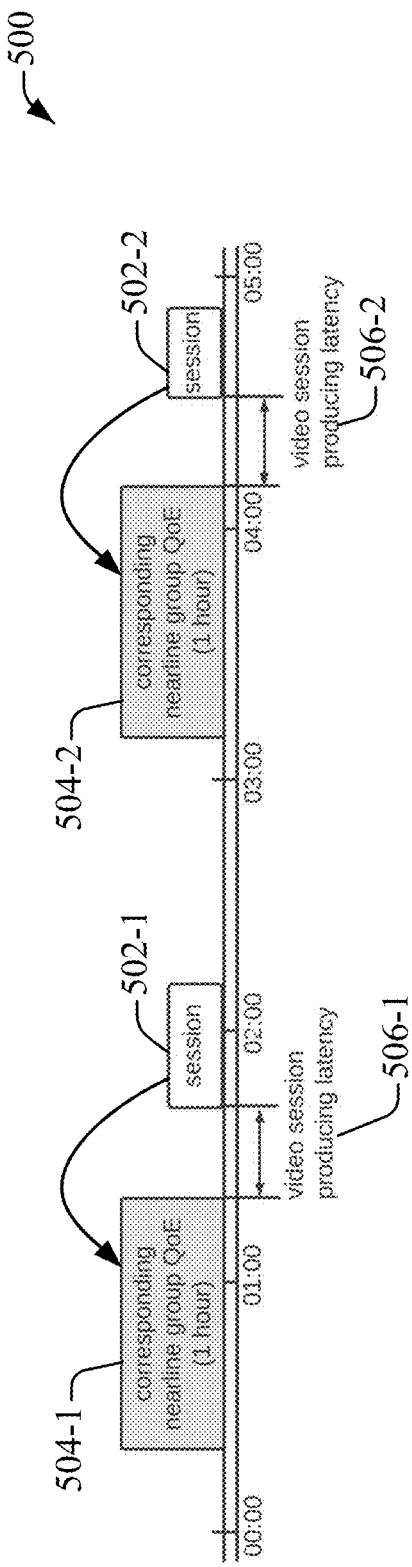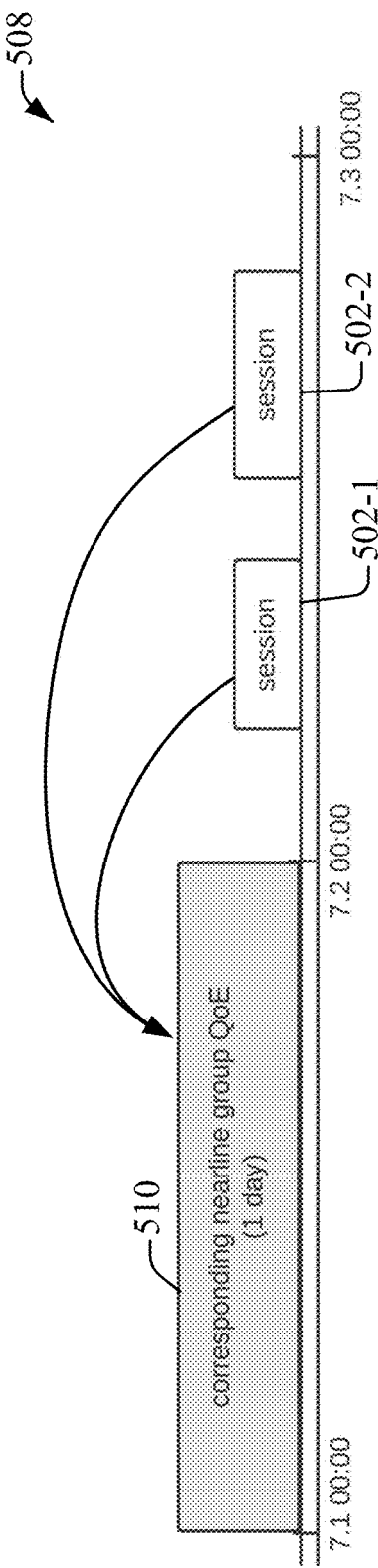
FIG. 5A
FIG. 5B

CONTENT PLAYBACK OPTIMIZATION USING NEARLINE INFORMATION

CROSS REFERENCE TO RELATED APPLICATIONS

This application is a continuation application and, pursuant to 35 U.S.C. § 120, is entitled to and claims the benefit of earlier filed application PCT App. No. PCT/CN2023/143071, filed Dec. 29, 2023, entitled "CONTENT PLAYBACK OPTIMIZATION USING NEARLINE INFORMATION", the content of which is incorporated herein by reference in its entirety for all purposes.

BACKGROUND

Playback quality of experience (QoE) is important in the content delivery process. Quality of experience may be a metric that is used to measure the experience for a user that is viewing content in the content delivery process. The quality of experience may affect how long content is watched, affect whether a content delivery service is active or canceled, and affect the revenue made from the service, or affect other content delivery aspects. Different features may affect the quality of experience, such as the performance of content delivery networks, the capabilities of client devices, network conditions, etc. Historical features may be aggregated for the quality of experience. Then, a prediction from the features may predict a quality of experience. A session may be optimized based on the prediction. The prediction may improve the quality of experience. However, the prediction may encounter some challenges because network conditions may not always be stable or historically similar.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 5A depicts an example of a sliding time window according to some embodiments.

FIG. 5B shows an example of a fixed time window according to some embodiments.

DETAILED DESCRIPTION

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system uses an improved prediction model to generate predictions for sessions. The prediction model may account for the variability of network conditions to improve the adjustments that are made in a content delivery process. For example, as discussed above, the network conditions may not always be stable or historically similar. During playback of content, there may be significant variations in the network conditions from historical data in which adjustments should be dynamically made in a timely manner to account for the variations. Also, network related issues may be transient. For example, congestion on a content delivery network may occur and then vanish in a short period of time, such as in a few minutes or a couple of hours. Further, the network related issues may be concentrated in some specific feature combinations. For example, an outage may affect only clients in a specific city when the clients use a specific content delivery network to watch specific content. When a prediction model is trained using historical data, the prediction model may not be able to react to some of the above occurrences in network conditions. However, the prediction model should be able to react to the transient conditions, which may not be represented in the historical data.

To account for the above network conditions, a prediction model may use a nearline mechanism that can incorporate data from nearline features. The nearline features may be determined from more recent data compared to historical data. This allows the prediction model to react to more recent variations in network conditions, and accurately predict the quality of experience. A prediction model may capture specific complex issue factors, and the system may make timely adjustments to the model. For example, the prediction model may be dynamically trained using the nearline features, and then the updated prediction model is used to generate the predictions for the current session, or upcoming sessions. The improvement in the prediction may result in timely adjustments that improve the quality of experience that is provided for playback sessions. For example, improved adjustments for content delivery processes, such as content delivery network selection or adjustments in the adaptive bitrate algorithm, may be performed using the predictions.

System Overview

Figure 1:
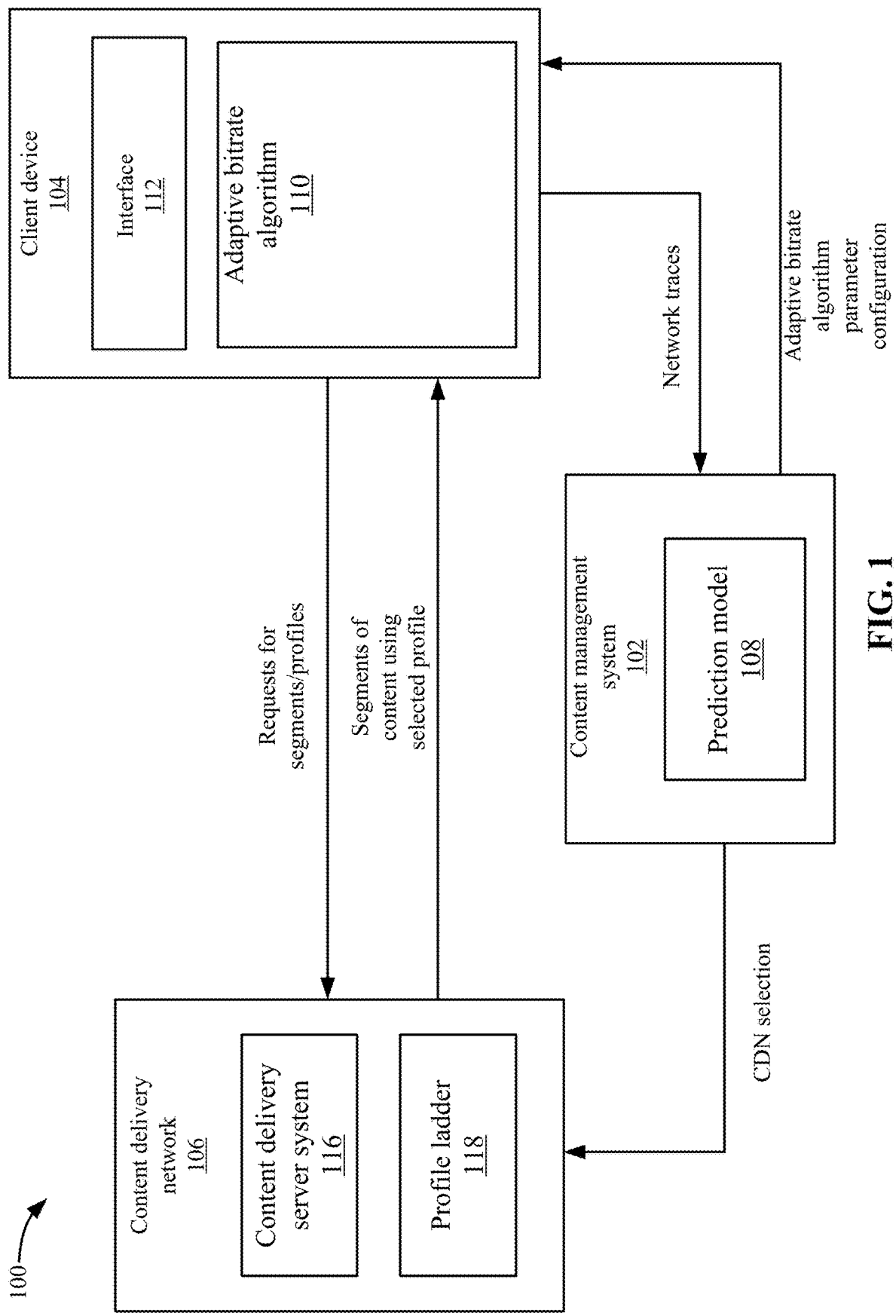
FIG. 1 depicts a simplified system for generating predictions for content delivery using nearline information according to some embodiments.

FIG. 1 depicts a simplified system 100 for generating predictions for content delivery using nearline information according to some embodiments. System 100 includes a content management system 102, a client device 104, and a content delivery network 106. Content management system 102, content delivery network 106, and client device 104 may be implemented using one or more computing devices. Also, although single instances of content management system 102, content delivery network 106, and client device 104 are shown, it will be understood that system 100 may include more than one content management system 102, content delivery network 106, or client device 104. For instance, content management system 102 may communicate with multiple client devices 104, and content delivery network 106 may send content to client devices 104 via multiple servers, etc. Also, even though content management system 102, content delivery network 106, and client device 104 are shown as separate entities, the functions performed by them may be distributed between them or to other entities.

Content management system 102 may provide a content delivery service that allows client device 104 to request content, such as videos on-demand or live videos from live television, audio, etc. Video may be used as an example for discussion purposes, but other content may be used. Content management system 102 may provide an application to client device 104 that can display an interface 112 at client device 104. A user account may log onto the application to access the content delivery service. Then, content management system 102 may receive a request from client device 104 and process the request to allow client device 104 to stream an instance of content.

Client device 104 may include a computing device that can playback content in interface 112, such as via a media player (not shown). Client device 104 may include a mobile phone, smartphone, set top box, television, living room device, tablet device, etc. Client devices 104 may operate on a platform, which may be classified by a type of device that operates on the platform. For example, platforms include mobile device platforms, living room device platforms, etc. A user account that is used by a user may use client device 104 to access the video delivery service. For example, the user account may log in to the content delivery service to identify information for the user account. When client device 104 receives a request for an instance of content from the user account, client device 104 may send the request to content management system 102 for that instance of content.

In the process to start playback of an instance of content, content management system 102 may receive the request for the instance of content from client device 104. Content management system 102 may select a content delivery network 106 and provide the information to content delivery network 106 or client device 104 to allow the instance of content to be streamed between content delivery network 106 and client device 104. Content management system 102 may also provide different information, such as a playback configuration and a media presentation description. The playback configuration may include available profiles for streaming, etc. The media presentation description may include information on profiles that are available, segment duration, and other characteristics of the video.

Content delivery network 106 includes servers that can deliver content to client device 104. For example, a content delivery server system 116 may include one or more servers that can deliver the instance of content to client device 104. In some embodiments, content delivery server system 116 delivers segments of video to client device 104. The segments may be a portion of the video, such as six seconds of the video. A video may be encoded in multiple profiles that correspond to different levels, which may be different levels of bitrates or quality. The multiple profiles may be referred to as a profile ladder 118. Each video may have an associated profile ladder 118 of profiles that have different levels of bitrates or quality. The profiles may be classified at different levels and each level may be associated with a different characteristic. For example, each level may be associated with a different bitrate, such as 400 kilobytes per second (kbps), 650 kbps, 1000 kbps, 1500 kbps, . . . , 12000 kbps. However, a level may be associated with another characteristic, such as a quality characteristic (e.g., resolution). For example, a level may be combination of bitrate and resolution. In some embodiments, the level may be determined based on how the video is encoded for the level, such as the video is encoded at the 400 kbps level for a profile associated with 400 kbps. The profile levels may be referred to as higher or lower, with profiles that have higher bitrates or quality being rated higher than profiles with lower bitrates or quality. Client device 104 may request a segment of video from one of the profile levels based on current playback conditions. The playback conditions may be any conditions that are experienced based on the playback of a video, such as available bandwidth, buffer length, etc. For example, client device 104 may use an adaptive bitrate algorithm 110 to select the profile for the video based on the current available bandwidth, buffer length, and other playback conditions.

Client device 104 may playback an instance of content during a playback session. Adaptive bitrate algorithm 110 may analyze current playback conditions (e.g., current available bandwidth, buffer length, etc.) during the playback session of an instance of content, such as a video, to select a profile from a profile ladder 118 that is associated with the instance of content. Adaptive bitrate algorithm 110 may be configured with parameter values that are used by the algorithm to select a profile from profile ladder 118 based on playback conditions.

Content management system 102 may receive network trace samples that describe the delivery of content from content delivery network 106 to client device 104 at a particular time or a set of times. The network trace samples may include metric values for metrics that are based on network conditions, such as bandwidth, round trip time, etc. Bandwidth may be the available bandwidth that is measured for the delivery of content. The round trip time may be the amount of time it takes a communication between content delivery network 106 and client device 104 to make a round trip, such as from client device 104 to content delivery network 106 and back to client device 104, or vice versa. In some embodiments, the network trace samples may be received from client device 104, but could be received from other devices such as content delivery network 106, or other network devices. The network trace samples may be a record that captures the network conditions experienced during a playback session. For example, when client device 104 requests the delivery of an instance of content, network trace samples for the session in which the delivery of the content occurs are received. A network trace may be generated for the session from the network trace samples. The network trace may describe the network conditions that were experienced during the session.

A prediction model 108 may receive input for features, and generate a prediction. The prediction may be for quality of experience. Also, the prediction can also be used for a network related metric prediction, such as bandwidth. For example, the streaming media content downloading bandwidth can be taken as the prediction target, and sessions within same country/region or based on some other features or division rules can be divided into the same group.

Additionally, content management system 102 can use the results of group partition alone without generating a prediction using prediction model 108. For example, content management system 102 divides sessions with similar network conditions or quality of experience into the same group. Content management system 102 can use the results directly and the sessions within the same group can share same configuration, such as an adaptive bitrate algorithm configuration. In this case, content management system 102 may not use the nearline features generation and prediction model.

The prediction may be used to perform an action associated with the content delivery process. For example, prediction model 108 may adjust a parameter in a content delivery network selection. Also, content management system 102 may adjust a parameter in adaptive bitrate algorithm 110. These adjustments may be performed dynamically for a current session or for a future session during a time period in which prediction model 108 is trained and updated. This allows prediction model 108 to react to near-term network conditions. The improved predictions may improve the quality of experience in the content delivery process.

In some embodiments, prediction model 108 may be trained and updated with a combination of nearline information and historical information at certain intervals, such as hourly, daily, every X minutes, etc. The nearline information may be more recent information than the historical information. The following will describe the process in more detail.

Prediction Process

Figure 2:
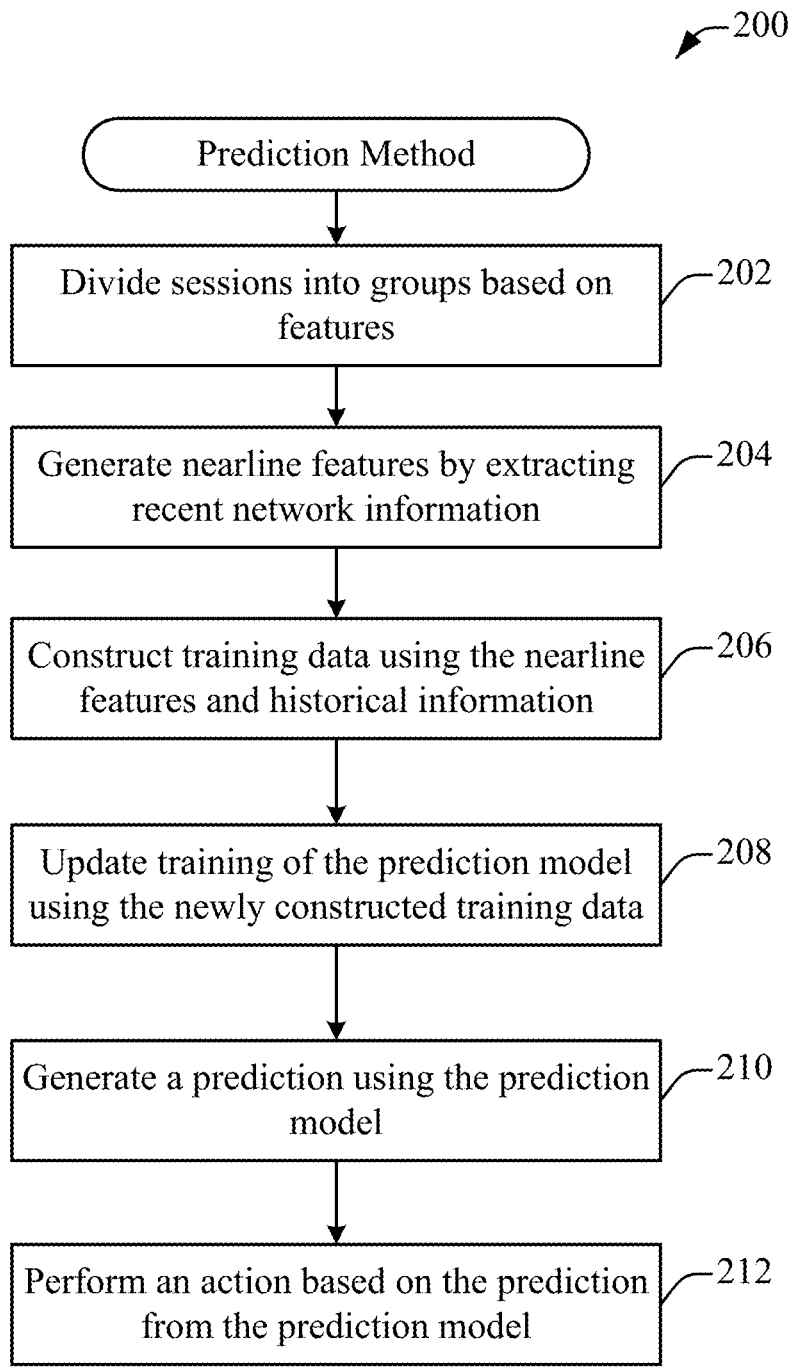
FIG. 2 depicts a simplified flowchart of a method for generating predictions according to some embodiments.

The following describes an overview of the prediction process. More detailed explanations of the following method will be described below. FIG. 2 depicts a simplified flowchart 200 of a method for generating predictions according to some embodiments. At 202, content management system 102 divides sessions into groups based on features. A session may be a playback session that occurs with a start time and an end time. For example, a session may be where an instance of content was played back. Sessions may also be based on other events in which predictions are being made. The sessions may be divided into multiple groups based on features that may influence quality of experience. The partitioning may subdivide different complex network scenarios into different groups. This may improve the understanding beyond considering the individual network trace. The groups may also be used as the basis for generating group level nearline features as will be described below. Although groups are described, groups may not be used and general data without groups may be used to perform predictions. In this case, the process for one group is described and the following process may be performed for each group.

At 204, content management system 102 generates nearline features by extracting recent network information. For example, the nearline features may be extracted based on the sessions in the associated group. For example, content management system 102 may determine the autonomous system number of the sessions in the group, the average bandwidth used during the sessions, etc. The group level aggregation of nearline features may allow prediction model 108 to directly learn the recent network conditions and quality of experience information from recent sessions of the group.

At 206, content management system 102 constructs training data using the nearline features. In some embodiments, content management system 102 may also use the historical data in the training data. For example, the training data may combine recent network information, such as the nearest hour of data, and also historical data, such as historical hourly data or the data from the previous day. This allows prediction model 108 to learn recent network variations and historical network patterns at the same time. The training data may be constructed for the features that were generated above at 204.

At 208, content management system 102 updates the training of prediction model 108 using the newly constructed training data. In some embodiments, the historical data may be from a first period, such as from a previous X days, or a specific hour from the last Y days. The updated training of prediction model 108 may be performed on a more recent time period than the first period, such as hourly in the current day. When the current day ends, the data from the current day becomes historical data, and the new data from the next day, which is now considered the current day is used to update prediction model 108. The training process will be described below.

After training, a request for an upcoming session may be received (e.g., a request for playback of content). Content management system 102 determines values for the features for the current session and inputs the values into prediction model 108. Then, at 210, prediction model 108 generates a prediction using values for the features. In some embodiments, prediction model 108 may generate a value, such as a probability or likelihood value for a quality of experience metric. For example, the quality of experience metric may include connection induced rebuffer ratio (CIRR), video start failure (VSF), video playback failures (VPF), etc. Connection induced rebuffer ratio may measure the likelihood that a rebuffer may occur. Video start failure may measure the likelihood that a failure may occur during the startup process. Video playback failure may measure the likelihood that a failure may occur during video playback. Other metrics may also be used.

At 212, content management system 102 may perform an action based on the prediction from prediction model 108. As discussed above, the action may adjust a parameter in a content delivery process, such as a parameter that is used to select a content delivery network, or adjusting a parameter in the adaptive bitrate algorithm. For example, a process may adjust a parameter for a content delivery network that has a near term disruption or low bandwidth to cause the content delivery network to not be selected as much. Also, a parameter for adaptive bitrate algorithm 110 may be adjusted to be more cautious when switching to a higher bitrate profile.

The following will describe the above process in more detail.

Group Partition

The group partition may segment sessions into multiple groups. The sessions with similar values, such as quality of experience metrics or network conditions, may be grouped together such that the quality of experience prediction of a session can learn valuable information from other sessions in the same group. The use of groups also prepares for the subsequent extraction of nearline features at the group level. That is, the definition of the groups may be used to aggregate nearline feature values at the group level. The grouping process may be based on critical features that may be influencing the quality of experience. In some embodiments, the grouping process may be determined to using different processes, such as a model-based partitioning or a rule-based partitioning process.

Content management system 102 determines critical features in sessions that may affect the quality of experience. The critical features may be based on insights that sessions with the same feature values have similar qualities, each session has a subset of critical features that ultimately determines its quality, and critical features tend to be persistent. Once the critical features are determined, content management system 102 divides the sessions into groups using the critical features. The sessions in the same group with the same critical features share similar network conditions. Then, the sessions in a group may help to predict the quality of experience of a target session that has similar features to the group. Because of the persistence in critical features, the critical features can be cached and reused for an amount of time for the prediction, such as cached for tens of minutes, several hours, etc.

A quality of experience metric, such as connection induced rebuffer ratio, may be a prediction target for prediction model 108. Content management system 102 determines critical features that may affect the quality of experience based on the prediction target. For example, the critical features that may affect connection induced rebuffer ratio may be determined. Content management system 102 may rank the importance of the features and the contribution of each feature to the quality of experience metric that is being predicted.

Figure 3:
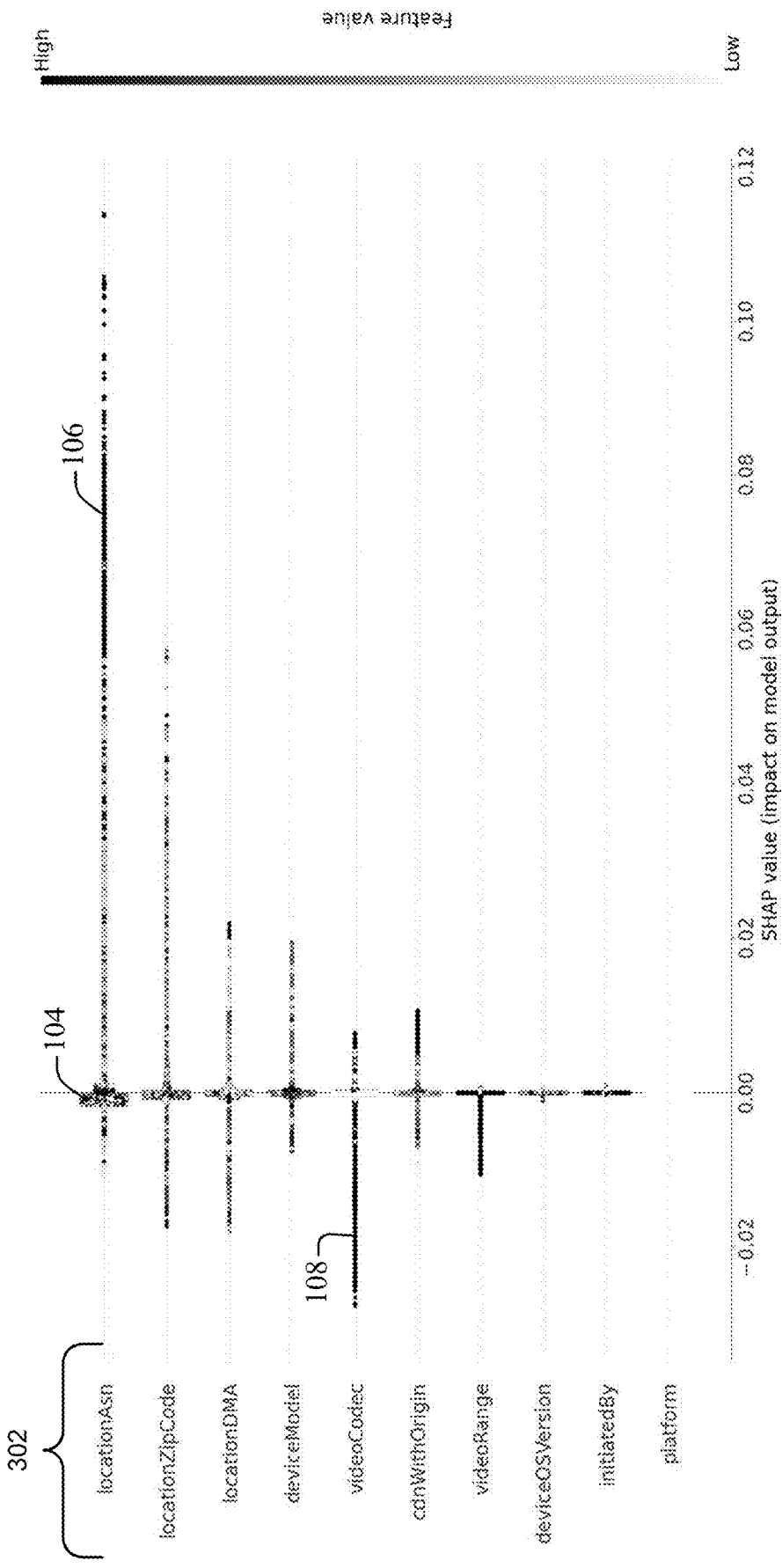
FIG. 3 shows an example of determining critical features according to some embodiments.

FIG. 3 shows an example of determining critical features according to some embodiments. In some embodiments, content management system 102 uses an approach that measures each feature's contribution to the final outcome of predicting the final prediction target of the quality of experience metric. The graph shows how each feature affects the final prediction target, the significance of each feature compared to others, and the reliance on the interaction between features. Features with positive values positively impact the prediction while features with negative values have a negative impact. The magnitude is a measure of how strong the effect is on the quality of experience metric.

At 302, different features are shown. The features may be from a set of location related, device related, and content delivery network related information that are applied as features. Other features may be used though. In some embodiments, the features may include location autonomous system number (locationASN), location zip code (locationZipCode), location designated market area (locationDMA), device model (deviceModel), video codec (videoCodec), CDN with origin (cdnWithOrigin), video range (videoRange), device OS version (deviceOSVersion), initiated by (initiatedBy), and platform (platform).

Location ASN may be the autonomous system number that is used to identify the router or network that is being used to deliver content. Location zip code may be the zip code in which content is being delivered. Location DMA may be the designated market area in which content is being delivered. Device model may be the model of client device 104 that is receiving the content. Video codec may be the video codec that was used to encode the content that is being delivered. CDN with origin may be the content delivery network that was selected to use for a session. Video range may be range of values that can be found in the video being delivered. The device OS version may be the operating system version of client device 104 that is receiving the content. The initiated by feature may be the intention which started playback, such as a user manually clicks or taps on a video to start playback or the application automatically plays the video after the precious one has ended, etc. The platform may be the platform type in which the content is being delivered, such as mobile device, living room, etc.

In the graph, a value of zero is shown at 304. The longer the value in the positive direction indicates a positive impact on the prediction target. A longer negative value indicates a negative impact on the prediction target. In the graph, the order of the critical features from most impact to lowest impact may be consistent across a time period, such as in tens of minutes to a couple hours. A value or cluster of values around zero means that some features values in the feature have less impact or zero impact for the prediction target. Accordingly, at 306, the feature of location ASN has a positive impact on the prediction and may be the most important feature since it has a long tail in the positive direction. However, at 308, video codec has a negative impact on the prediction target due to a negative value. In this case, location related features, such as location ASN, location zip code, and location DMA, may have an important impact on the prediction target. However, video codec may not have much of an impact on the prediction target.

Group Partitioning

Once content management system 102 determines the critical features, content management system 102 may generate groups using the critical features. The groups may be generated using different processes, such as a model-based partitioning process or a rule-based partitioning process. In the model-based partitioning process, a structure, such as a tree structure, may be used to divide the data with similar labels into the same leaf node. The model-based partitioning process may use a tree model to automatically generate groups to distinguish the quality of experience performance of sessions.

The tree model may learn the decision rules of the structure from the features. During the training process, at each node of the tree, the data is split based on specific thresholds on the features to create subsets of data that may have a higher degree of similarity or are purer with respect to the prediction target. In some embodiments, content management system 102 trains a single tree with a group numbers controlled through a hyperparameter of the model, such as the maximum number of leaf nodes in the tree. The training may make each data sample fall into a unique group.

Figure 4:
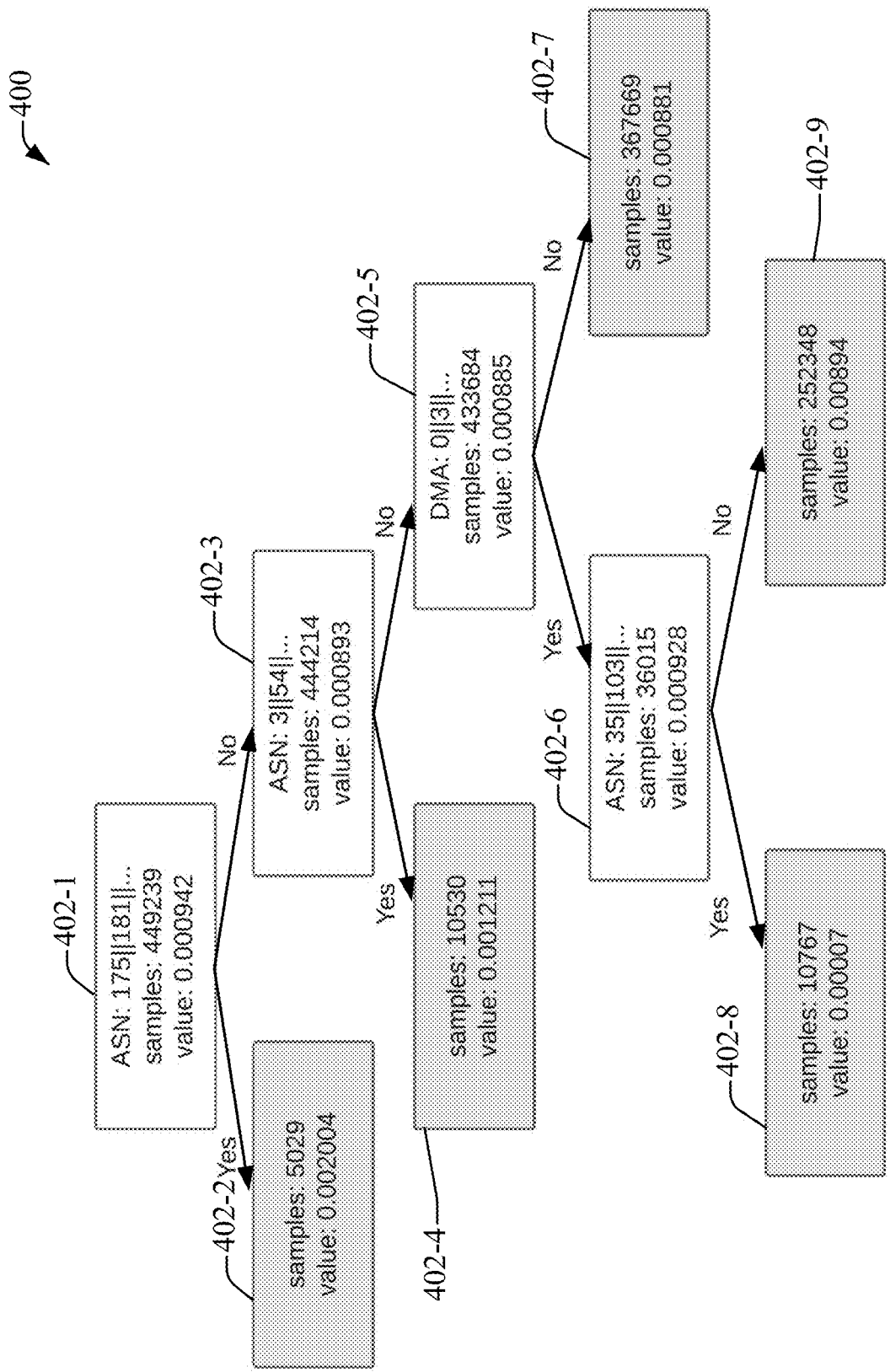
FIG. 4 depicts an example of a tree structure that is generated according to some embodiments.

FIG. 4 depicts an example of a tree structure 400 that is generated according to some embodiments. In the example, the target quality of experience metric, such as connection induced rebuffer ratio, is used as the label to generate the tree structure, and the critical features extracted from above in FIG. 3 are used as the feature input to the tree model. In some embodiments, the sessions in a time period, such as sessions in a previous hour, are used as the training data input. Also, content management system 102 may specify hyperparameters to ensure that each leaf node has sufficient data to calculate robust and reliable quality of experience metrics. For example, the hyperparameters may set the minimum number of samples in a leaf as 5000 and the maximum number of leaf nodes as five; however, these hyper parameters may be adjusted as needed.

In tree structure 400, the critical features of autonomous system number and DMA are used, but other features may be used. The tree model may split the nodes based on determining subsets of data that have a high degree of similarity with respect to the prediction target. Each node displays the feature threshold on which the node is based on to split the data. For example, a first node at 402-1 includes a condition for the autonomous system number of 175 or 181, or other specified autonomous system numbers. The number of samples that are associated with this node are 449239, which may be the possible number of sessions that can or cannot be classified with the autonomous system number of 175 or 181, or other specified autonomous system numbers. The value of 0.000942 is the average value of connection induced rebuffer ratio for the 449239 samples in the 402-1 node, which is used as the label to generate the tree structure in this example. Other labels may also be used. In some embodiments, the value may be based on an aggregation of the values from these sessions, such as an average autonomous system number.

For node 402-2, if the autonomous system number is 175 or 181, or other specified autonomous system numbers, then the session is classified in node 402-2. The number of samples in this node is 5029 and the associated value for these sessions is 0.002004. This is a leaf node so the condition does not exist as the leaf node is not split again.

For node 402-3, the node has the condition of whether the autonomous system number is 3 or 54, or other specified autonomous system numbers. The number of samples in this node is 444214 and the value is 0.000893. If the session has an autonomous system number of 3 or 54, or other specified autonomous system numbers, it falls within node 402-4. The number of samples for node 402-4 is 10530 and the value is 0.001211. If a session does not fall within the autonomous system number specified by node 402-3, a node 402-5 is created with a condition of the DMA values are 0 or 3, or other specified designated market area. The number of samples for node 402-5 is 433684 and the value is 0.000885. If a session falls within the DMA of 0 or 3, or other specified designated market area, then a node is created at 406-2. The condition for node 402-6 is the autonomous system number of 35 or 103, or other specified autonomous system numbers. The number of sessions for this node is 36015 and the value is 0.000928. If a session has the autonomous system number of 35 or 103, or other specified autonomous system numbers, the session is classified in the leaf node 402-8. The number of samples for this leaf node is 10767 and the value is 0.00007. If a session does not fall within the above autonomous system numbers for node 402-6, the session is classified in the node at 402-9. The number of sessions that fall within node 402-9 is 252348 and the value is 0.00894. Referring back to node 402-5, if a session does not have a DMA of 0 or 3 or other specified designated market area, a leaf node 402-7 is created. The number of sessions for this leaf node 402-7 is 367669 and the value is 0.000881.

There are now five leaf nodes at 402-2, 402-4, 402-7, 402-8, and 402-9 and the process is stopped. The group partition results of number of samples and value are shown in the leaf nodes. The model-based group partition process offers strong flexibility and scalability in feature input. Content management system 102 can select the top critical features that are found in the process above in FIG. 3 or incorporate additional features without many adjustments to the model because the decision tree model has the ability to automatically compute the split thresholds for each feature. Consequently, the model provides convenience when adjusting feature input according to the requirements of different use cases. For example, if content management system 102 wants the group partitioning to focus more on the content delivery network and use more content delivery network related features for the use case of optimizing the content delivery network selection, a content delivery network feature can be added as the input in the group partition process. Alternatively, if the adaptive bitrate algorithm is the focus, an adaptive bitrate algorithm feature may be added as input.

In addition to the model-based partitioning process, a rules-based group partitioning process may be used. The rules-based partitioning process may use different rules, such as rules that balance complexity and effectiveness. In some embodiments, the rules-based partitioning process may use autonomous system number, which was determined to be the most important feature in the critical feature extraction for the basis of forming groups, but may use other features, or combinations of features. The autonomous system number feature may have a pronounced cephalic concentration (e.g., head-like) and a very long tail. This may mean a small number of head-like autonomous system numbers account for most of the traffic, while a large number of tail-like autonomous system numbers account for very little traffic. This may mean that content management system 102 cannot separate each autonomous system number into a group, because the traffic of autonomous system numbers in the tail is very small and the metrics calculated from the autonomous system number group will be highly volatile and unreliable. Thus, some autonomous system numbers in the tail may be merged to create better groups.

In some embodiments, there may be 3000 autonomous system numbers in total. A smaller number of autonomous system numbers may cover a large portion of the sessions. In this example, the top 20 autonomous system numbers cover more than 80% of the sessions. If the autonomous system numbers are used alone, the group at the tail may contain very few sessions, and the calculated quality of experience in the small groups may be highly volatile. Considering the daily quality of experience pattern of each autonomous system number may be relatively stable in the granularity of a time period, such as a day, content management system 102 may combine small instances of autonomous system numbers using the target quality of experience metrics, such as connection induced rebuffer ratio, to merge small instances of autonomous system numbers and provide more robust quality of experience metrics.

In some embodiments, the autonomous system number (ASN) may be grouped into 56 groups via the rules-based process based on the following rules. Although these rules are described, other rules may be appreciated. An example of a group decision rule is designed as follows:

First 50 groups (group1-group50): the top 50 ASNs in the previous time period, such as a month All other ASN are merged into several groups according to connection induced rebuffer (CIRR) in the previous month:
1. Group 51: ASNs with CIRR<0.05%
2. Group 52: ASNs with CIRR 0.05~0.1%
3. Group 53: ASNs with CIRR 0.1%~0.2%
4. Group 54: ASNs with CIRR 0.2%~0.5%
5. Group 55: ASNs with CIRR 0.5%~1%
6. Group 56: ASNs with CIRR>1%

If a session has an autonomous system number, according to a rule, it is categorized in the respective group. The first 50 groups include a single autonomous system number as these are the largest groups. Some groups are formed with multiple autonomous system numbers, such as groups 51, 52, 53, 54, 55, and 56. These groups include autonomous system numbers with connection induced rebuffer ratios that are similar. If an autonomous system number meets a threshold associated with the group, the autonomous system number is classified in the respective group. Accordingly, the first 50 groups of groups 1-50 may be the top 50 autonomous system numbers in the previous time period, such as in the previous month. All other autonomous system number are merged into several groups according to rules based on the quality of experience metric, such as connection induced rebuffer ratio, in the previous month.

Following the group generation, content management system 102 generates nearline features.

Nearline Features Generation

After the group generation, each session may be mapped to its related group. Then, content management system 102 can calculate the quality of experience metrics from the sessions in the same group as the nearline features for the group. A current session in which a prediction is to be generated may be analyzed and mapped to its nearline group. For example, the characteristics of the group may be used to determine which nearline group in which a current session should be mapped. In some embodiments, if the current session has an autonomous system number of 175 or 181, the current session is mapped to the group associated with node 402-2 in FIG. 4.

The nearline features may be based on different time windows, such as a sliding time window and a fixed time window. The sliding time window may change during a first time period and has a number of time units (e.g., minutes or hours) that is less than the fixed time window. For example, the sliding time window may be the information from a previous time, such as an hour, from the start time of a current session in which a prediction is to be made. The sliding time window may change during the first time period. Also, the fixed time window may be a fixed time period, such as the previous day from the start time of the current session, and be a number of time units that is equal to the first time period. Accordingly, the sliding time window changes according to the start time of the current session during the first time period. The fixed time window may not change for the first time period, such as the entire day.

For the sliding time window, the interval for the sliding time window may be a second time period, such as one hour. That is, the sliding time window to compute feature values is one hour. The feature values may be quality of experience metrics (e.g., connection induced rebuffer ratio, video start failures, video playback failures, etc.); network information (e.g., bitrate, throughput, etc.), and content delivery network related information (e.g., hit ratio (a ratio of serving segments from cache versus origin server), round-trip time, etc.) on the group in which the current session belongs.

FIG. 5A depicts an example 500 of a sliding time window according to some embodiments. A first current session is shown at 502-1 and a second current session is shown at 502-2. The second current session started after the first current session during the day. A sliding time window is shown at 504-1 for the current session at 502-1, and a sliding time window at 504-2 is shown for a current session at 502-2. The sliding time windows are different because the start time for the first current session at 502-1 is different from the start time of the second current session at 502-2. The corresponding nearline group for the time windows at 504-1 and 504-2 may be the same or different depending on the features of the current session at 502-1 and 502-2, respectively. For example, the first current session at 502-1 may be categorized in a different nearline group compared to the second current session at 502-2. Thus, the nearline groups may be different at 504-1 and 504-2. Considering the latency of current sessions, the sliding time window may be determined with a slight latency to the start time of the current session, such as several minutes. For example, a first gap 506-1 or second gap 506-2 of the latency is 20 minutes from the start of the current session, the start time and the end time of the sliding time window is [start time of the current session—80 minutes, start time of the session—20 minutes].

FIG. 5B shows an example 508 of a fixed time window according to some embodiments. In this example, the fixed time window is the previous day from the current session. For example, a fixed time window 510 is from the previous day compared to the current session at 502-1 or the current session at 502-2. The same fixed time window may be used for all current sessions that are classified (e.g., start) within the next day. Although the previous day is used, other fixed time windows may be used, such as the previous two days, three days, N days, previous week, previous month, etc.

The features that may be used may be the daily quality of experience metrics (e.g., CIRR, VSF, VPF), network information (e.g., bitrate, throughput), and content delivery network information (e.g., hit ratio, round trip time) of the group in which the session belongs. Other nearline features may also be collected. For example, the previous session's playback duration on the same client device 104 may be used as a nearline feature. The previous session's playback duration may have a positive correlation with the playback durations between consecutive sessions on the same client device 104.

Nearline features may be generated dynamically and depend on the nearline group in which the current session belongs. The nearline features may include nearline group features and also static features. The static features may be based on the current session itself, such as the autonomous system number, the content delivery network, etc. The static features may be based on a combination of sessions with the same static feature values. The nearline group features may be determined from sessions in the nearline group. The confidence level may indicate the confidence in which the group features have in predicting accurate results. For example, because the more sessions a group contains, the breath of information the group may provide may be greater and be provided at greater weight. When there are only a small number of sessions in a group, the calculated metric values for the features may have a strong volatility. In this case, the values for the group may yield not as accurate predictions. The confidence levels for these features may be lower compared to groups that have a larger number of sessions.

The nearline features may include the following in Table I, but other nearline features may be used.

TABLE I

| Nearline Feature Types | | Specific Features |
|---|---|---|
| QoE and network information in the nearline group | QoE related information | CIRR in the previous hour, VSF in the previous hour, VPF in the previous hour, CIRR in the previous day, VSF in the previous day, VPF in the previous day |
| | bitrate and throughput information | average bitrate in the previous hour, average throughput in the previous hour, average bitrate in the previous day, average throughput in the previous day |
| | CDN related information | hit ratio in the previous hour, hit ratio in the previous day, round trip time in the previous hour, round trip time in the previous day |
| playback session series information on the same device | previous session playback duration information | previous playing time |
| The confidence level of the nearline and static group | nearline group attempts confidence level | nearline group confidence level in the previous hour, nearline group confidence level in the previous day |
| | static group attempts confidence level | static group confidence level in the previous hour, static group confidence level in the previous day |

The nearline features may be based on quality of experience (QoE) and network information in the nearline group, playback session series information on the same device, or the confidence level of the nearline group and static group.

The quality of experience and network information may include quality of experience related information, bitrate and throughput information, and content delivery network related information. The specific features may include connection induced rebuffer ratio, video startup failures, and video playback failures in the previous hour, previous day, for quality of experience related information. The bitrate and throughput information may include the average bitrate, average throughput in the previous hour and previous daytime periods. The content delivery related information may include the hit ratio and round-trip ratio. Also, other time periods may be used.

The playback session series information may include previous session playback duration information. The previous session playback duration information may be the duration of playback from the last session.

The confidence level of the nearline and static group may include a nearline group sessions confidence level and a static group sessions confidence level. The nearline group attempts confidence level may include the nearline group confidence level in the previous hour and previous daytime interval. The static group attempts confidence level may include the static group confidence level in the previous hour or previous day intervals. Also, other intervals may be used.

After defining the nearline features, the training data may then be prepared to train the prediction model 108.

Training Data Preparation

Content management system 102 may update prediction model 108 based on a timing interval associated with the nearline mechanism. For example, because the nearline mechanism uses data at the hourly level, content management system 102 may use data in the nearest previous hour as training data to capture the nearline information as training data for prediction model 108. The dynamic training using the nearline information may dynamically update prediction model 108, which improves the predictions.

The training data for a time period, such as an hour, for the nearline data may be used. However, the scale of the training data for the time interval, such as an hour, may be small. Content management system 102 may use other data in addition to the last hour of data to expand the training data. In some cases, some combinations of features that may need to be predicted may not be found in the training data for the last hour. In some examples, the quality of experience fluctuations may be cyclical every day. That is, the same hour from a previous day may be similar to the same hour of the present day. In some examples, the behavior of content delivery may be similar in the evening time for multiple days. Accordingly, content management system 102 may add a similar hour of training data from the past X days to expand the scale of training data. This training data may have a similar quality of experience performance to the nearline hour, and the hour that is going to be predicted, but also expands the breath of training data. The similar hour of training data may be the corresponding hour of training data to the nearline data or the current hour. The number of days may vary, but one, two, three, etc., days may be used. Accordingly, content management system 102 may generate a training data set that combines the nearline hour, and a corresponding hour to the nearline hour for the past X days as a training data set to train prediction model 108 for use in a future time period, such as the next hour. The predictions of prediction model 108 may have a higher accuracy and recall capability compared to a model that does not use this training data set, such as a model that is updated daily.

Increasing the model update frequency, such as from daily to hourly, and using the previous hours' data may improve the prediction, because the data in the previous hour may be more informative for the prediction and can improve the prediction accuracy compared to data from the previous day. For example, a network interruption in the previous hour may be more accurate than the data from the previous day. However, the data from the previous day may still be relevant if the outage is resolved.

The hourly data uses one hour of data, but the previous day uses 24 hours of data, thus, the previous day is a multiple of the hourly data. This would be true if two hours of previous nearline data is used, and two days of data are used. Accordingly, there may be more different feature combinations in sessions in the previous day that may not be present in the previous hour's training data set. Considering that quality of experience fluctuations may be cyclical every day, the same hour of training data from multiple previous days may also expand the scale of training data, but also have a similar quality of experience performance to the hour that is going to be predicted. To provide recent training data and increase the feature richness of feature combinations in the training data, content management system 102 may use training data from the previous one hour and also data from the corresponding hour for the past X days, such as the last three days. Accordingly, content management system 102 may use the previous hour of nearline data and hourly data corresponding to the nearline data hour for the last X days. For example, if content management system 102 is predicting the quality of experience for the 7:00-8:00 hour on December 4th, the hourly data in the previous hour of 6:00-7:00 on December 4th is used and the corresponding hour of 7:00-8:00 on previous days, like December $3^{rd}$, $2^{nd}$, $1^{st}$ is used. Other combinations of training data may also exist.

The features that are used may be important to generate accurate predictions from prediction model 108. In some embodiments, content management system 102 uses static features and dynamic nearline features. The dynamic nearline features are generated using the nearline group to which a current session belongs. Static features may be features associated with the current session itself. The static features may not change in the previous hour or previous day. The static features and the dynamic nearline features may be combined as feature input to train prediction model 108.

Content management system 102 may determine the dynamic nearline features and the dynamic nearline features may change on an hourly basis. The nearline features may be quality of experience-related, network-related, or content delivery network-related information. The nearline features may be based on the group of the session or the device associated with the session. The features that were described above in Table I may be used.

To train prediction model 108, a label may be used as the ground truth. For example, the label may include different target quality of experience metrics, such as connection induced rebuffer ratio, video startup failures, video playback failures, etc. If connection induced rebuffer ratio is used, the label may be a value for the connection induced rebuffer ratio for the previous hour. The training data may be used as described above, and may be the data from the previous hour and the same hour in the previous three days.

Prediction model 108 may be trained using the training data and the label. In some embodiments, prediction model 108 may be trained in a time interval that is based on the nearline data. For example, if the nearline data is updated every hour, then prediction model 108 is updated and trained hourly. The trained prediction model 108 may then be used to generate predictions for sessions in the next hour.

The training may use different supervised machine learning model or deep learning model that may have a regression objective or classification object, such as Random Forest, AdaBoost, a deep neural network, support vector machine (SVM), etc. In the training, the features may be input into prediction model 108, and prediction model 108 outputs a prediction. The prediction is compared to the label, and a loss is determined. The parameters of prediction model 108 may then be adjusted to reduce the loss.

Prediction Generation

Once prediction model 108 is trained, content management system 102 may generate predictions, such as in the next hour for current sessions. A current session in which a prediction is to be generated may be analyzed and mapped to its nearline group. For example, the characteristics of respective nearline groups may be used to determine which nearline group a current session should be mapped. In some embodiments, if the current session has an autonomous system number of 175 or 181, the current session is mapped to the nearline group associated with node 402-2 in FIG. 4.

Figure 6:
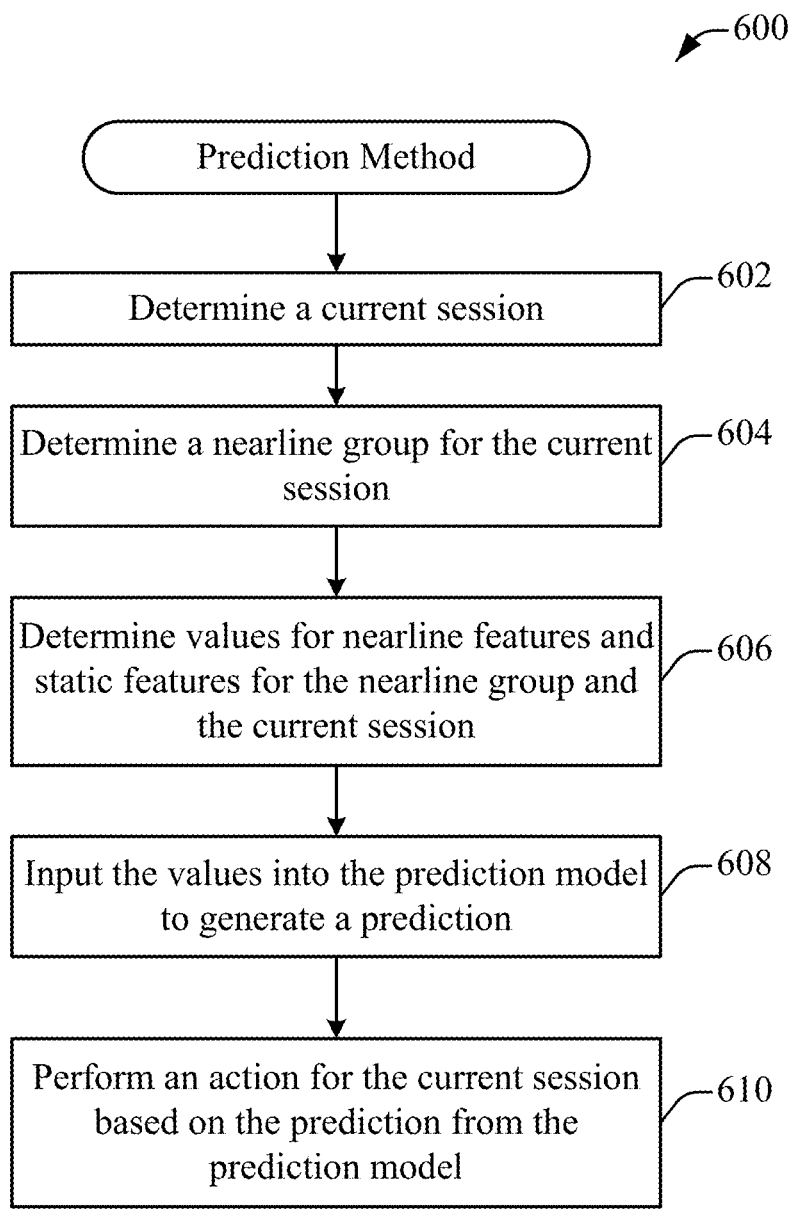
FIG. 6 depicts a simplified flowchart of a method for generating predictions according to some embodiments.

FIG. 6 depicts a simplified flowchart 600 of a method for generating predictions according to some embodiments. At 602, content management system 102 determines a current session. For example, a request for an instance of content may be received from client device 104.

At 604, content management system 102 determines a nearline group for the current session. For example, features of the session may be used to classify the current session in one of the nearline groups that was generated. In some examples, if the autonomous system number is 175, then content management system 102 classifies the current session in the nearline group defined by 402-2 in FIG. 4.

At 606, content management system 102 determines values for nearline features and static features for the nearline group and the current session. The nearline features may be based on the features described in Table I. As discussed above, the nearline features may be from the previous hour, corresponding hours in previous days, or the previous day's data. Static features may be based on features of the current session.

At 608, content management system 102 inputs the values into prediction model 108 to generate a prediction. As discussed above, prediction model 108 may be updated on intervals based on the nearline group generation. For example, the nearline group is based on a previous hour in the same day, the prediction model 108 may be updated hourly. Another interval may also be used within the day that is less than the day, such as every two hours, three hours, etc. The value of the prediction may be based on the target of the prediction. If connection induced rebuffer ratio is selected as the target, a prediction of a higher score means a greater risk of a rebuffer. If the output of prediction model 108 is 0.90, there is a higher risk of a rebuffer compared to if the output is 0.10.

At 610, content management system 102 performs an action for the current session based on the prediction from the prediction model. For example, content management system 102 may adjust parameters of a process being used for the current session, such as a content delivery network selection process or the adaptive bitrate algorithm that is being used by client device 104 in the current session. For example, if a likelihood value for a connection induced rebuffer ratio is high, then content management system 102 may adjust parameters in the adaptive bitrate algorithm to request a lower initial bitrate profile or a safe factor to select lower bitrate profiles for the current session.

The use of the nearline features with static features may improve the performance of prediction model 108. For example, prediction model 108 may have improvements in recall and precision after adding the nearline features to the static features. Recall is a performance measurement that measures the ability to correctly identify the target variable. Precision is a measure of how accurately prediction model 108 aligns with the true positive cases.

Prediction model 108 may capture recent information in a timely manner that improves the prediction. The use of nearline features that are generated and the information from the nearline features, such as from the previous hour improves the training of prediction model 108. For example, the network variation in the previous hour can be captured in the prediction. If a specific combination of features that captures a significant network related issue is not common in the historical data, such as in the previous day, the use of nearline features may capture information for this specific combination and be used to train prediction model 108. This may improve the predictions in the future. Also, the combination of static features and nearline features improves the accuracy of prediction model 108. Further, the use of nearline groups may also improve the prediction by using features from the nearline group that is similar to the current session to generate the prediction.

System

Figure 7:
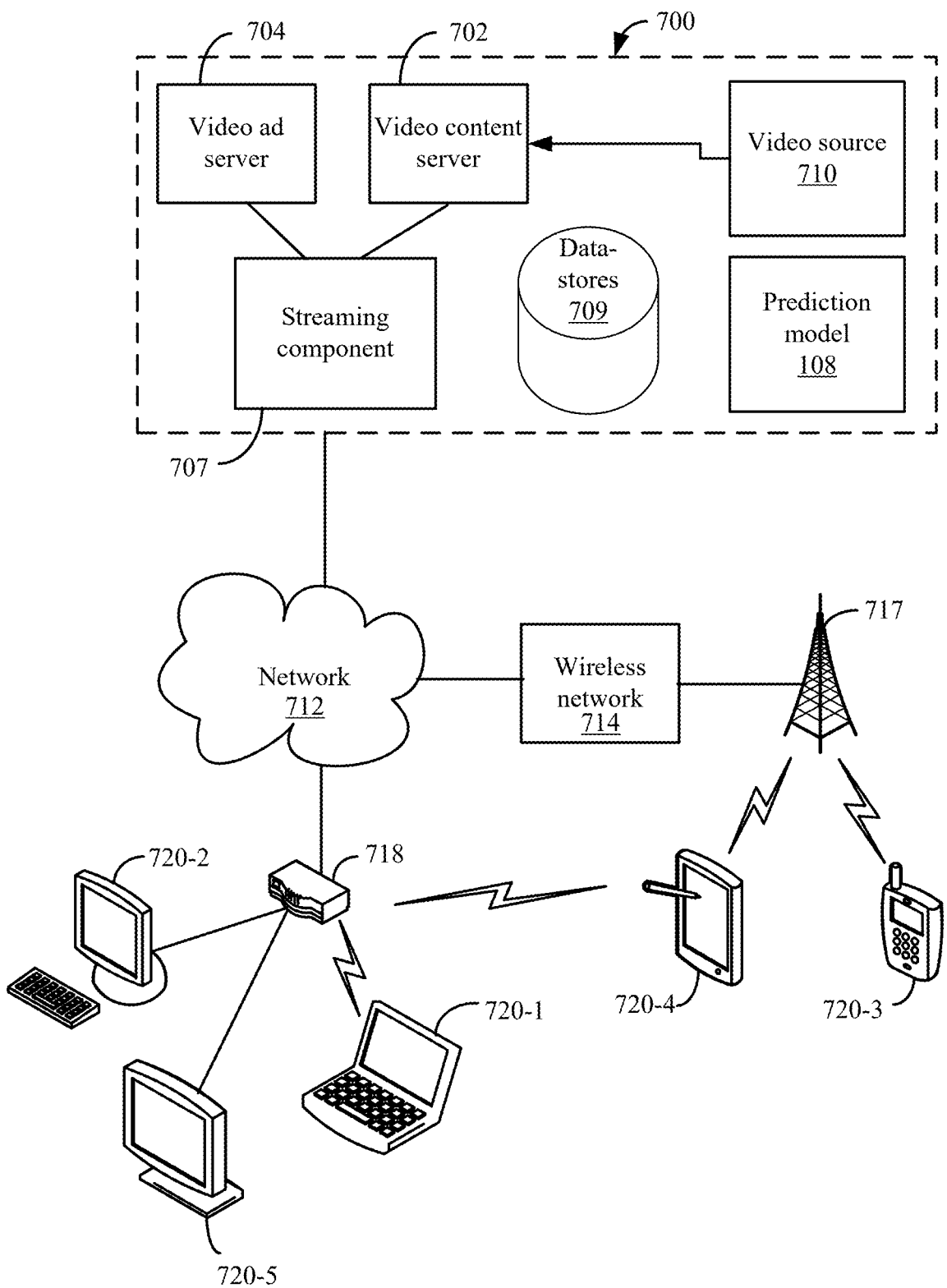
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources, for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include prediction model 108.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless network 714 (e.g., a wireless cellular telecommunications network (WCS)), or some combination of these or similar networks.

One or more client devices 720 may be in communication with the video streaming system 700, via the data communication network 712, wireless network 714, or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for wireless network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
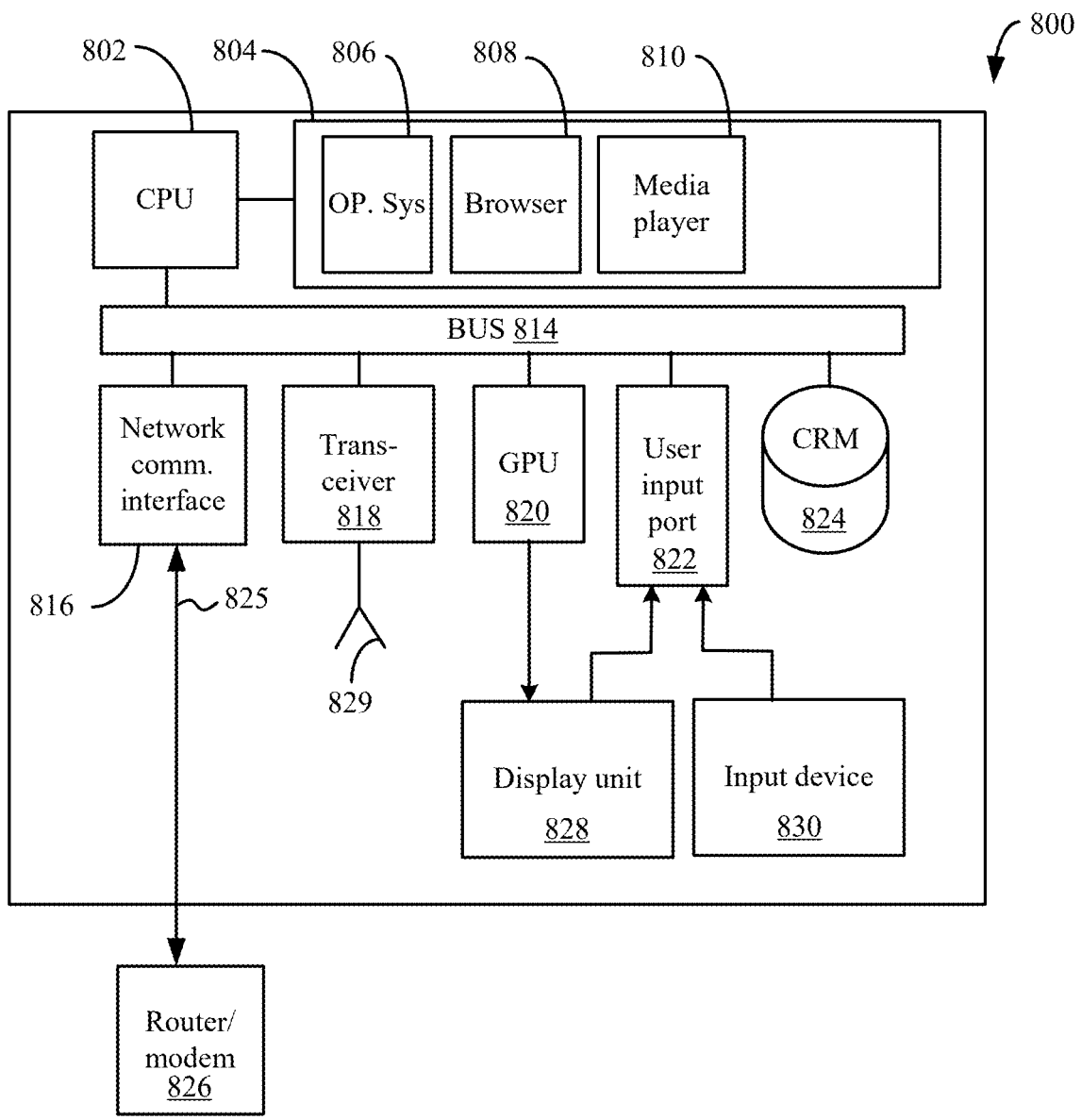
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication components may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules for operating system 806, browser 808, and media player 810 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A network communication (comm.) interface 816 may also be connected to the bus 814. The network communication interface 816 may provide or support two-way data communication between the apparatus 800 and one or more external devices, e.g., the streaming system 700, optionally via a router/modem 826 and a wired or wireless connection 825. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   determining training data from first nearline features for a first sliding time window, wherein the first sliding time window changes during a first time period;
   training a prediction model using the training data, wherein the prediction model is trained for a second time period that is within the first time period;
   determining first values for second nearline features for a second sliding time window and second values for the second nearline features for a fixed time window for a request for a current session that is received during the second time period, wherein:
      the second sliding time window is based on a time for the request and changes within the first time period based on different times of requests that are received during the second time period, and the fixed time window is static during the first time period and used for requests that are received during the second time period;
inputting the first values and the second values for the second nearline features into the prediction model to generate a prediction; and
performing an action for the current session based on the prediction.

2. The method of claim 1, further comprising:
determining a group of a plurality of groups for the current session, wherein groups in the plurality of groups are associated with different feature values; and
determining the first values or the second values for the second nearline features for the group, wherein the first values or the second values for the second nearline features for the group are input into the prediction model.

3. The method of claim 2, wherein:
groups in the plurality of groups include different characteristics,
the current session includes first characteristics, and
the first characteristics are compared to the different characteristics of the groups to select the group.

4. The method of claim 2, wherein the first values for the second nearline features for the second sliding time window and the second values for the second nearline features for the fixed time window are from the group.

5. The method of claim 1, further comprising:
analyzing features from the first sliding time window and the fixed time window; and
selecting the first nearline features as a portion of the features based on scores of which features affect the prediction.

6. The method of claim 5, further comprising:
analyzing the first nearline features to generate a plurality of groups of sessions, wherein sessions in a group include values for features that meet a rule.

7. The method of claim 6, wherein:
groups in the plurality of groups are formed based on a model-based partitioning that determines a structure to partition sessions into the groups based on applying thresholds to values for the first nearline features.

8. The method of claim 6, wherein:
groups in the plurality of groups are formed based on a rules-based partitioning that determines sessions for the groups based on applying rules to values for the first nearline features.

9. The method of claim 6, wherein training the prediction model comprises:
training the prediction model using the groups, wherein the prediction model is trained to generate the prediction for respective groups.

10. The method of claim 1, wherein training the prediction model comprises:
updating the training of the prediction model based on intervals for the first sliding time window in the first time period.

11. The method of claim 1, wherein training the prediction model comprises:
updating the training of the prediction model using training data for the first nearline features in a first interval for the first sliding time window in the first time period; and
updating the training of the prediction model using training data for the first nearline features in a second interval for the first sliding time window in the first time period, wherein the second interval is after the first interval.

12. The method of claim 1, wherein training the prediction model comprises:
after the first time period ends, the fixed time window is based on the first time period and the second sliding time window is based on a third time period after the first time period.

13. The method of claim 1, wherein:
the first sliding window comprises a first time window, and
the training data includes data from a third sliding time window that corresponds to the first sliding time window in a different time period than the first time period.

14. The method of claim 13, wherein:
the first sliding time window comprises X time units of a first portion in the first time period, and
the third sliding time window comprises the X time units in a corresponding portion of a third time period.

15. The method of claim 1, wherein performing the action for the current session comprises:
adjusting a parameter in an adaptive bitrate algorithm that is used during delivery of content during the current session.

16. The method of claim 1, wherein performing the action for the current session comprises:
adjusting a parameter in a process to select a content delivery network for delivering content during the current session.

17. The method of claim 1, wherein:
the first sliding time window includes time units that are less than the fixed time window,
the second sliding time window includes time units that are less than the fixed time window, and
the first time period includes time units that are equal to the fixed time window.

18. The method of claim 1, wherein:
the first sliding time window comprises a X units of time, and
the fixed time window comprises Y units of time before the first sliding time window, wherein Y units of time is greater than X units of time.

19. A non-transitory computer-readable storage medium having stored thereon computer executable instructions, which when executed by a computing device, cause the computing device to be operable for:
determining training data from first nearline features for a first sliding time window, wherein the first sliding time window changes during a first time period;
training a prediction model using the training data, wherein the prediction model is trained for a second time period that is within the first time period;
determining first values for second nearline features for a second sliding time window and second values for the second nearline features for a fixed time window for a request for a current session that is received during the second time period, wherein:
the second sliding time window is based on a time for the request and changes within the first time period based on different times of requests that are received during the second time period, and
the fixed time window is static during the first time period and used for requests that are received during the second time period;

inputting the first values and the second values for the second nearline features into the prediction model to generate a prediction; and performing an action for the current session based on the prediction.

20. An apparatus comprising:

one or more computer processors; and a computer-readable storage medium comprising instructions for controlling the one or more computer processors to be operable for:

determining training data from first nearline features for a first sliding time window, wherein the first sliding time window changes during a first time period;

training a prediction model using the training data, wherein the prediction model is trained for a second time period that is within the first time period;

determining first values for second nearline features for a second sliding time window and second values for the second nearline features for a fixed time window for a request for a current session that is received during the second time period, wherein:

the second sliding time window is based on a time for the request and changes with first time period based on different times of requests that are received during the second time period, and the fixed time window is static during the first time period and used for requests that are received during the second time period;

inputting the first values and the second values for the second nearline features into the prediction model to generate a prediction; and performing an action for the current session based on the prediction.

* * * * *

UNITED STATES PATENT AND TRADEMARK OFFICE
CERTIFICATE OF CORRECTION

PATENT NO. : 12,355,834 B1
APPLICATION NO. : 18/421835
DATED : July 8, 2025
INVENTOR(S) : Renfei Shang et al.

Page 1 of 1

It is certified that error appears in the above-identified patent and that said Letters Patent is hereby corrected as shown below:

In the Claims

Claim 20, Column 24, Line 6: after "changes", delete "with" insert --within the--

Signed and Sealed this
Thirtieth Day of September, 2025

John A. Squires
*Director of the United States Patent and Trademark Office*